United States Patent
Eschbach et al.

(10) Patent No.: US 9,420,171 B2
(45) Date of Patent: Aug. 16, 2016

(54) DYNAMIC MULTI-WINDOWED IMAGE ENHANCEMENT FOR INTERACTIVE HOV DETECTION

(71) Applicant: Xerox Corporation, Norwalk, CT (US)

(72) Inventors: Reiner Eschbach, Webster, NY (US); Beilei Xu, Penfield, NY (US); Peter Paul, Webster, NY (US)

(73) Assignee: XEROX CORPORATION, Norwalk, CT (US)

(*) Notice: Subject to any disclaimer, the term of this patent is extended or adjusted under 35 U.S.C. 154(b) by 339 days.

(21) Appl. No.: 14/049,578

(22) Filed: Oct. 9, 2013

(65) Prior Publication Data

US 2015/0097952 A1    Apr. 9, 2015

(51) Int. Cl.
H04N 5/00 (2011.01)
H04N 5/232 (2006.01)
H04N 7/18 (2006.01)
G06K 9/00 (2006.01)
G06T 5/00 (2006.01)
G06T 5/40 (2006.01)

(52) U.S. Cl.
CPC ........ H04N 5/23229 (2013.01); G06K 9/00785 (2013.01); G06T 5/008 (2013.01); G06T 5/40 (2013.01); H04N 7/183 (2013.01)

(58) Field of Classification Search
CPC .... B60R 1/00; B60R 2300/105; B60R 11/04; B60R 2300/802; H04N 7/181; H04N 5/2256; G01C 3/08; G01S 7/484; G01S 7/495; G01S 7/51; G01S 17/107; G01S 17/89; G01S 7/489; G02B 23/12; G02B 27/01; G02B 27/0101; G02B 2027/014; G02B 5/30; G02B 2027/0118; G02B 2027/12; G02B 2027/0127; G02B 2027/0138
See application file for complete search history.

(56) References Cited

U.S. PATENT DOCUMENTS

| | | | | |
|---|---|---|---|---|
| 7,733,464 B2* | 6/2010 | David | | G01S 7/484 356/5.03 |
| 7,881,496 B2* | 2/2011 | Camilleri | | B60R 1/00 340/904 |
| 2010/0265316 A1* | 10/2010 | Sali | | H04N 13/0037 348/46 |
| 2011/0164789 A1* | 7/2011 | Robert | | G06K 9/00798 382/104 |
| 2011/0293141 A1* | 12/2011 | Robert | | G06K 9/00785 382/103 |
| 2013/0329006 A1* | 12/2013 | Boles | | G06F 17/30879 348/42 |

OTHER PUBLICATIONS

Histogram http://www.wavemetrics.com/products/igorpro/imageprocessing/ imagetransforms/histmodification.htm, accessed 2012.*

* cited by examiner

*Primary Examiner* — Jay Patel
*Assistant Examiner* — Frank Huang
(74) *Attorney, Agent, or Firm* — Fay Sharpe LLP

(57) ABSTRACT

A system and method for enhancing images including an image capture device operably connected to a data processing device that captures an image of a target vehicle, and a processor-usable medium embodying computer code, said processor-usable medium being coupled to said data processing device, said computer program code comprising instructions executable by said processor. The instructions configured for identifying a region within the image including a window of the target vehicle, applying a first image enhancement effect to the identified region, applying a second image enhancement effect to a remainder of the image not including the identified region, the second image enhancement effect different than the first image enhancement effect.

20 Claims, 5 Drawing Sheets

DYNAMIC MULTI-WINDOWED IMAGE ENHANCEMENT FOR INTERACTIVE HOV DETECTION

BACKGROUND

In order to manage ever increasing traffic numbers, special lanes are introduced that allow only traffic with more than a certain number of occupants inside a vehicle. These managed lanes include carpool, diamond, or HOV lanes that are intended to reduce the total number of cars (for a given number of people) on the highway and thus to speed up travel. The overall benefits are obvious in multiple areas and the managed lanes reduce lost time, reduce fuel consumption and decrease pollution. Managed lanes, such as HOV lanes, are typically the left most lanes of a highway and are often denoted by diamond markings on the pavement within the lanes and/or signage.

In order to be effective, the adherence to the occupancy numbers has to be enforced. Since managed lanes generally give a clear advantage in terms of travel time, people are tempted to cheat the system and use the lane even if the vehicle does not carry the sufficient number of occupants (or is otherwise ineligible). This tendency to cheat sometimes also includes efforts to avoid detection, including the use of dummies or mannequins to simulate a second passenger.

To enforce the rules of managed lanes, current practice requires dispatching law enforcement officers at the side of HOV/HOT lanes to visually examine passing vehicles. This method is expensive, difficult, and ultimately ineffective as few violators are actually caught and ticketed. An alternate method of monitoring managed lanes is image-based automatic enforcement which requires identification and classification of image features (e.g., faces, seats, seat belts, etc.) behind a windshield that are visible to the camera to distinguish a driver+passenger configuration vs. a driver only configuration. This method is highly dependent upon camera placement and timing to obtain a clear image of the interior of a vehicle.

The clear incentive to cheat establishes the need that a police officer (or other authorized person) can easily verify if there is a sufficient number of people in the car. In order to do this effectively, the police officer has to be able to make the determination while traffic is moving at highway speed and false positives should be kept to a minimum. In some currently employed systems, an officer gets a visual representation of the car and has to use his/her display to decide. An example of such visual representations taken using conventional equipment (near-infrared (NIR) camera illumination camera) is illustrated in images 10 of FIG. 1.

From FIG. 1, it can be appreciated that often the actual camera data is not a good source for making any decision, since the total dynamic range of the image—in general—is way too high to be directly useful.

INCORPORATION BY REFERENCE

The following reference, the disclosure of which is incorporated herein in its entirety by reference is mentioned:
U.S. application Ser. No. 13/859,047, filed Apr. 9, 2013.

BRIEF DESCRIPTION

In the past, conventional image enhancement techniques would be applied to clarify and/or sharpen the images. Such approach, however, fails to recognize the special scenario presented wherein a human is the recipient of the enhanced image. This is true whether the image is examined by a human to determine a compliance violation or, in a fully automated system, a human is still the likely recipient in any legal challenge (e.g., the alleged violater, judge, jury, etc. will examine the enhanced image). In addition, since the images already cover the entire dynamic range, any enhancement would automatically lead to a loss of data in other image areas.

Accordingly, the present disclosure sets forth a multi-window enhancement system and method wherein different image areas are enhanced differently. This hybrid enhancement acknowledges a human observer, but favors 'detection' over 'preference'. In other words, a human should consider the image sufficiently "natural" and "good", but it is more preferred to see image details (e.g., in shadows, etc.) than to avoid artifacts. Thus, the system and method results in a "stronger" effect than conventional Automatic Image Enhancement (AIE) but a less severe effect than enhancement for target recognition.

In accordance with one aspect, a system for enhancing images comprises an image capture device operably connected to a data processing device that captures an image of a target vehicle, and a processor-usable medium embodying computer code, said processor-usable medium being coupled to said data processing device, said computer program code comprising instructions executable by said processor and configured for identifying a region within the image including a window of the target vehicle, applying a first image enhancement effect to the identified region, applying a second image enhancement effect to a remainder of the image not including the identified region, the second image enhancement effect different than the first image enhancement effect.

The first and second image enhancement effects can include a histogram transformation. The first image enhancement effect can include a histogram transformation including a blind histogram stretching. The image capture device can generate a 10-bit video signal, and the blind histogram stretching can be performed using the lowest 8 bits of the 10 bit video signal. The second image enhancement effect can include a histogram transformation utilizing substantially the entire dynamic range of the image. The histogram transformation can be applied to a modified histogram. The modified histogram can be generated using Histogrammod=$H^X$(bin), where Histogrammod represents the modified histogram, H represents the horizontal number of pixels of the image capture device, and X is between 0.5 and 0.8, and in one embodiment is 0.7. The first image enhancement effect and the second image enhancement effect can be performed at the same time.

In accordance with another aspect, a computer implemented method of enhancing an image comprises identifying a target vehicle within the image, identifying a region within the image including a window of the target vehicle, applying a first image enhancement effect to the identified region, and applying a second image enhancement effect to a remainder of the image not including the identified region, the second image enhancement effect different than the first image enhancement effect.

The first and second image enhancement effects can include a histogram transformation. The first image enhancement effect can include a histogram transformation including a blind histogram stretching. The second image enhancement effect can include a histogram transformation utilizing substantially the entire dynamic range of the image. The histogram transformation can be applied to a modified histogram generated using Histogrammod=$H^X$(bin), where Histogrammod represents the modified histogram, H represents the horizontal number of pixels of the image capture device, and where X is between 0.5 and 0.8. The first image enhancement effect and the second image enhancement effect can be performed at the same time.

In accordance with another aspect, a non-transitory computer-usable medium for enhancing an image, said computer-usable medium embodying a computer program code, said computer program code comprising computer executable instructions configured for identifying a target vehicle within the image, identifying a region within the image including a window of the target vehicle, applying a first image enhancement effect to the identified region, and applying a second image enhancement effect to a remainder of the image not including the identified region, the second image enhancement effect different than the first image enhancement effect.

The first and second image enhancement effects can include a histogram transformation. The histogram transformation can be applied to a modified histogram generated using Histogrammod=$H^X$(bin), where Histogrammod represents the modified histogram, H represents the horizontal number of pixels of the image capture device, and X is between 0.5 and 0.8.

DETAILED DESCRIPTION

The present disclosure sets forth a system and method for enhancing the visual representation of managed lane (e.g., HOV lane) information to a human observer (e.g., police officer). For this, an image is not only dynamically enhanced (on an image by image basis), but regions of interest (ROI) are dynamically defined and the enhancement is tailored towards those regions thereby producing an enhanced image that appears more natural while also highlighting details in particular regions of interest.

Figure 2:
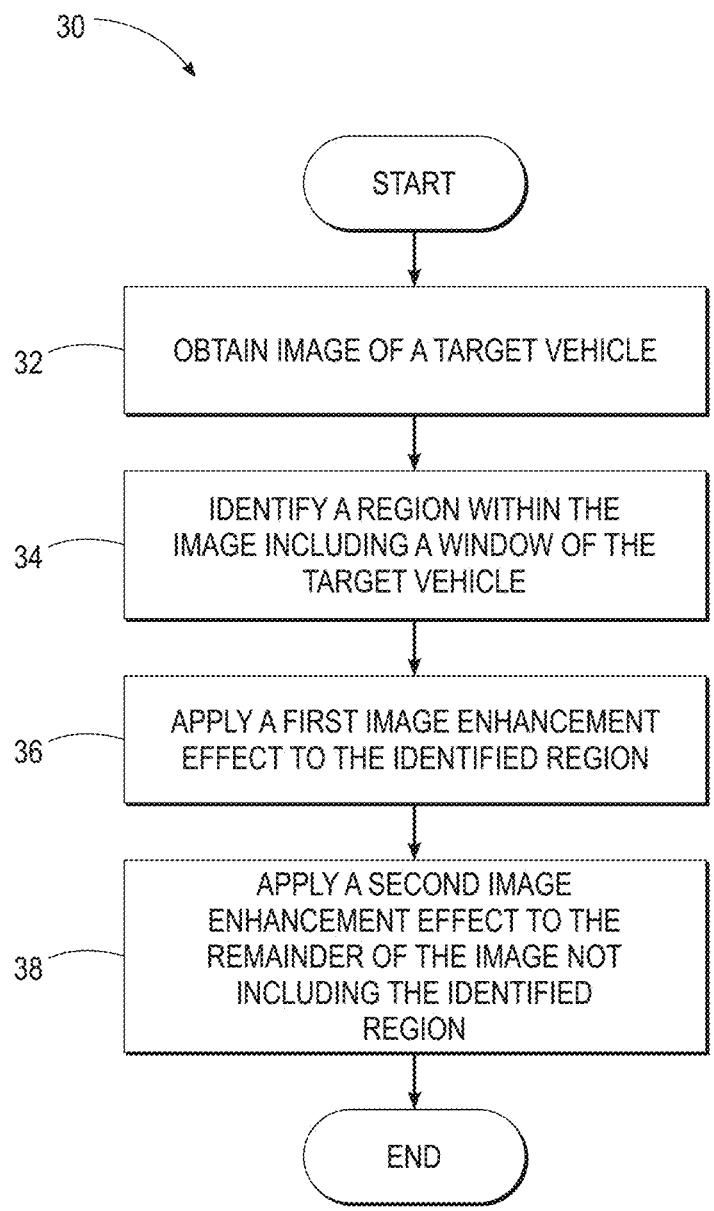
FIG. 2 is a flowchart of an exemplary method in accordance with the present disclosure.

With reference to FIG. 2, an exemplary method in accordance with the present disclosure is illustrated and identified generally by reference number 30. The method begins with process step 32 wherein an image of a target vehicle is obtained. It will be appreciated that the image can be obtained from a wide variety of sources such as a video feed or a still camera mounted roadside and configured to capture images of vehicles travelling in a manage lane or lanes. In addition, a wide variety of technology can be employed to capture images having desired attributes. In one embodiment, an NIR flash can be implemented to assist in illuminating the interior of a vehicle.

In process step 34, a region within the image including a window is identified. In some applications, the window can be the front windshield of the vehicle. In other applications, the window can be a side or rear window of the vehicle. By identifying the region including a window, later steps in the method can then focus on such region to maximize. Various methods exist for identifying the region, including the methods set forth in commonly-assigned U.S. patent application Ser. No. 13/859,047 filed on Apr. 9, 2013, which is hereby incorporated herein in its entirety.

In process step 36, a first image enhancement effect is applied to the identified region. It will be appreciated that a wide variety of image enhancement effects can be applied. In one embodiment, a histogram transformation is applied to the region. Further details of the first image enhancement effect are provided below.

In process step 38, a second image enhancement effect is applied to the remaining portion of the image not including the identified region. The second image enhancement effect is generally different than the first image enhancement effect. Further details of the second image enhancement effect are also provided below.

As will be seen below, by applying different image enhancement effects to different portions of the image the overall image can retain a more normal or natural appearance while still providing enough enhancement to darker regions of the image to display important details for an observer to determine compliance.

Figure 3:
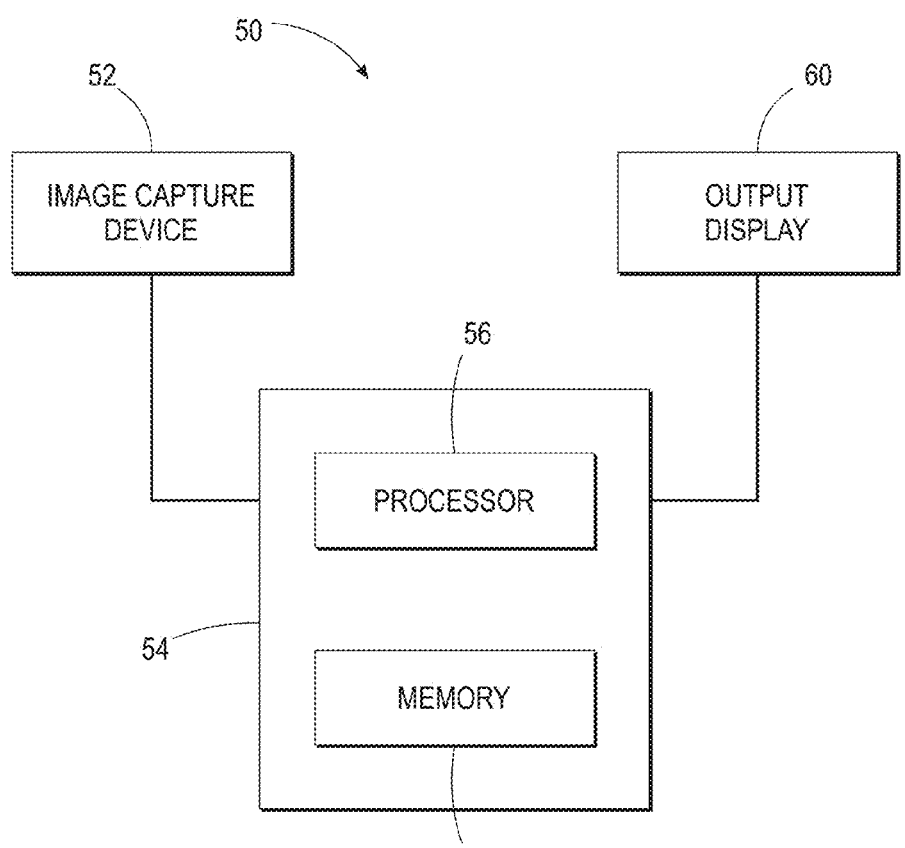
FIG. 3 is a schematic block diagram of an exemplary system in accordance with the present disclosure.

Turning now to FIG. 3, a basic system in accordance with the present disclosure is illustrated and identified generally by reference numeral 50. The system generally includes an image capture device 52 coupled to a processing unit 54 that includes both a processor 56 and a memory 58 for storing computer executable instructions to perform the method in accordance with the present disclosure. An output display 60 is provided for displaying the enhanced image. It will be appreciated that the image capture device 52, the processing unit 54 and the output display can be remotely located from one another depending on the particular installation. In some arrangements, some or all of the components can be located together.

Figure 4:
FIG. 4 is a depiction of a typical image generated by an image capture device of a vehicle travelling in a managed lane with the region including the windshield identified in accordance with the present disclosure.
Figure 5:
FIG. 5 is the image of FIG. 4 after an image enhancement effect is applied to a remainder of the image not including the region including the windshield.
Figure 6:
FIG. 6 is the image of FIG. 5 after an image enhancement effect is applied to the identified region including the windshield.

Referring now to FIGS. 4-6, an example of image processing in accordance with aspects of the present disclosure will be described. Beginning with FIG. 4, an image 70 including a target vehicle is analyzed using a window detection algorithm. The windshield is identified and, in this example, the edges of the windshield are marked with small white squares indicating the detection.

In FIGS. 5 and 6, once the windshield has been identified as the potential occupancy area, two different enhancement settings (e.g., image enhancement effects) are applied on the outside and on the inside of the identified region. In this instance, the term "settings" also encompasses the statistical data that is used in the algorithm. The first enhancement is done on the background area (e.g., the remainder of the image outside the identified region). The intention or goal for this enhancement is a better visual display mainly of the vehicle to aid in later identification. Because current systems generally utilize a single channel camera in the near IR, this enhancement can make the vehicle look more normal or natural.

In this embodiment, this enhancement uses the complete camera dynamic range. As a first step, the image histogram is computed:

Histogram=$H$(bin), where $H$ represents the horizontal number of pixels of the image capture device In the past, one would now typically "flatten" or "equalize" the histogram. This, however, leads to very "unnatural" images as has been shown in AIE (e.g.: U.S. Pat. No. 5,450, 502). Consequently, the present disclosure uses a weighting function to balance the histogram. For this, a power law is introduced:

$$\text{Histogram}_{mod} = H^X(\text{bin}) \text{ where } 0 \leq X \leq 1.$$

It is this modified histogram that is mathematically flattened rather than the original histogram. Effectively, this allows the trade-off of the two ends, with X=1 being actual histogram flattening and X=0 being the no flattening. In conventional AIE, a value of $0 \leq X \leq 0.2$ is typically used for visual preference. As mentioned above, the current scenario is a hybrid of perception and detection and thus a larger value $0.5 \leq X \leq 0.8$ is desired, while still staying well below the histogram flattening. The final tone reproduction curve (TRC) is computed:

$$\text{TRC} = \text{flat}\{H^{0.7}(\text{bin})\}.$$

FIG. 5 shows the image of FIG. 4 after using the described enhancement for the background, leaving the pre-detected windshield area unprocessed. The image is generally identified by reference numeral 70a.

Figure 1:
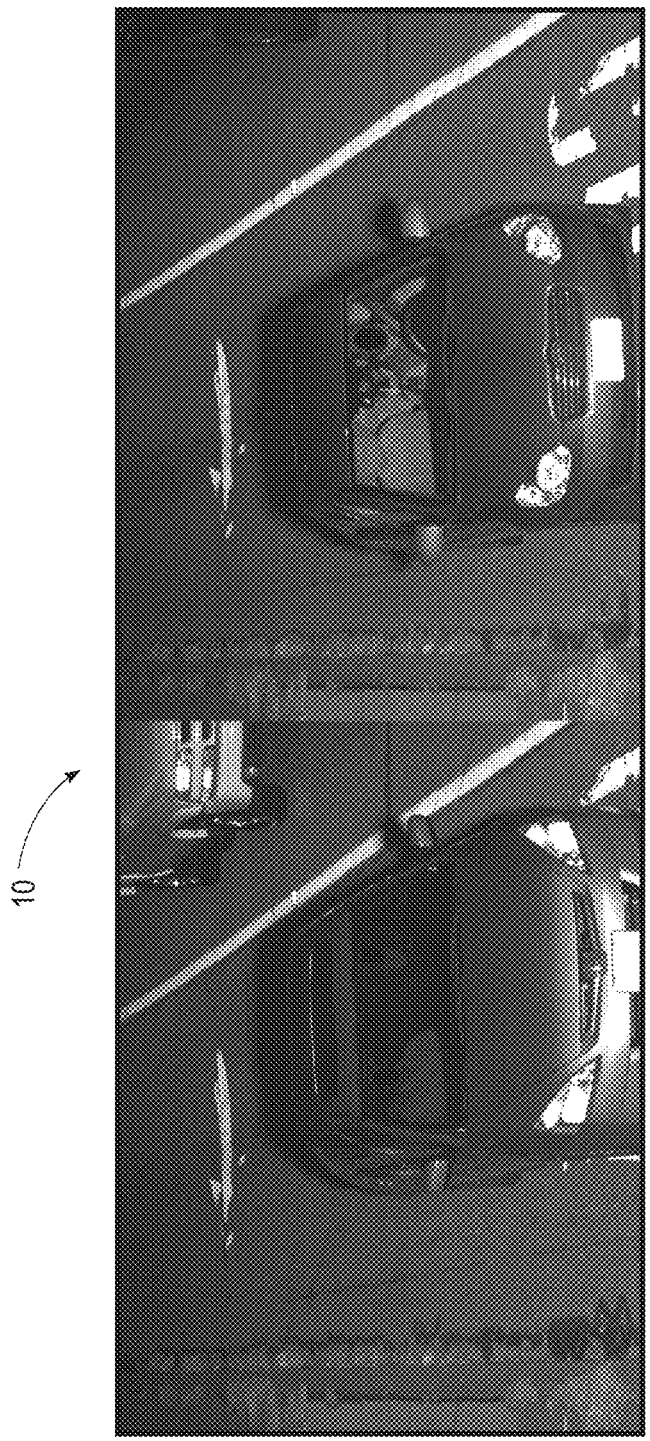
FIG. 1 is a pair of near-infrared images of vehicles in managed lanes taken with a conventional image capture device.

In FIG. 6, the identified region including the windshield is enhanced. This image is generally identified by reference numeral 70b. The image enhancements are shown in the Figures as occurring in a certain order, but it should be appreciated that the enhancements can be done in any order, or simultaneously as desired. In this embodiment, the enhancement applied to the identified region is similar to the enhancement applied to the background with the addition of a pre-processing step. Recall that the entire dynamic range was used for processing the background and, as can be seen from FIG. 1, the background area indeed generally covers the entire dynamic range.

The identified region including the windshield, however, is always darker than the remaining portion of the image due to some of the IR flash being reflected/refracted as it passes through the windshield. Simply making the enhancement more aggressive would have the drawback that artifacts would be introduced into the enhanced images making them look less natural and/or washing out certain regions of the image.

Accordingly, the second enhancement includes first performing a coarse adjustment of the dynamic range. In this embodiment, only the lowest 8 bits of the 10 bit signal are used thereby essentially performing a "blind" histogram stretching.

It should be appreciated that the area around the windshield often has highly reflective components and that the imprecision of the fully automatic windshield determination can cause some of those components to potentially be inside the identified windshield area.

If we enhance the windshield with the variation described above, we obtain a multi-window enhancement 70b shown in FIG. 6.

Comparing FIGS. 4 and 6 one sees the effect of the enhancement. Not only the detection of occupants is now easily possible, but the overall identification of the car is also made easier. The emblem and grill of the vehicle remain visible. The multi-window enhancement has increased clarity in at least two distinct manners:
 1. The overall look of the image is perceptually "believable", reducing visual stress on the observer; and
 2. Identifying the vehicle in the image helps in the correct identification of the vehicle in traffic, and can potentially decrease offender challenges to the image.

Also, it should be appreciated that in the exemplary multi-window enhancement output shown in FIG. 6, a clear artifact appears at the windshield boundary, but that this artifact generally escapes visual attention. The reason for this artifact hiding is that the artifact line corresponds to an object boundary of two objects that are normally not important to a human observer. Accordingly, the enhanced image of FIG. 6 retains a more normal/natural look.

Figure 7:
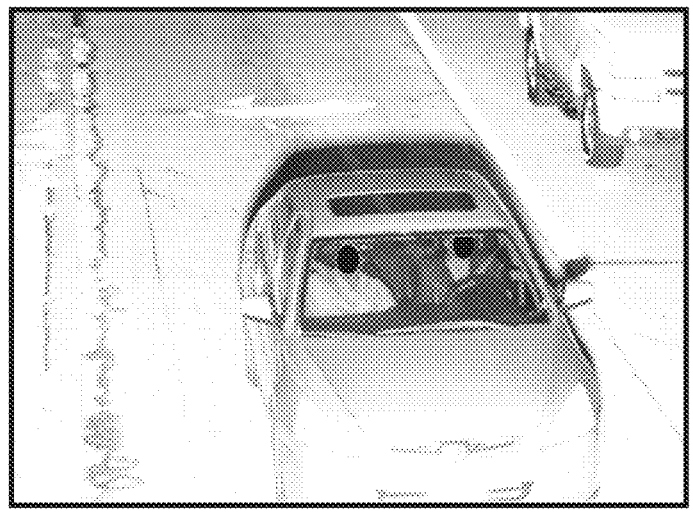
FIG. 7 is an example of an image undergoing a single enhancement effect.

For comparison, FIG. 7 illustrates a single enhancement effect applied to an entire image 76 based on the windshield area. This is necessary since only such enhancement allows identifying the occupants. This enhancement would make the windshield area "equal" in the digital data (not necessarily in the perception), and all statistical sampling comes from the windshield area. As expected, the background of FIG. 7 is severely over-enhanced leading to an unnatural looking image.

It should also be noted that although the windshield area is "equal" in digital description to, for example, FIG. 6, a perceptual difference arises. By over-enhancing the background, an observer is forced to adapt to a much lighter overall image, with most "light" areas being outside of the relevant part (e.g., the windshield). This leads an observer to focus on less relevant areas and tends to visually de-emphasize the relevant area. Both outcomes are generally negative in the planned scenario.

Comparing FIGS. 6 and 7, it is apparent that a single-window enhancement is much less effective at maintaining a normal/natural look to the image. In particular, note that in FIG. 6, using the method described above, the vehicle can clearly be seen as showing the manufacturer symbol on the front grill, while in FIG. 7, due to the over-enhancement of areas outside the windshield, the manufacturer symbol on the front grill is difficult to see, making the vehicle harder to identify.

It should be appreciated that aspect of the disclosure can also be an input to a later version automated system wherein occupancy is automatically detected based on the enhance image output in accordance with the present disclosure.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for enhancing images comprising:
 an image capture device operably connected to a data processing device that captures an image of a target vehicle; and
 a processor-usable non-transitory medium embodying computer code, said processor-usable medium being coupled to said data processing device, said computer program code comprising instructions executable by said processor and configured for:
 identifying a region within the image including a window of the target vehicle;
 computing a first image enhancement effect for the identified region;
 applying the first image enhancement effect to the identified region;
 computing a second image enhancement effect for a remainder of the image not including the identified region;
 applying the second image enhancement effect to the remainder of the image not including the identified region, the second image enhancement effect different than the first image enhancement effect;

wherein the first and second image enhancement effects are computed independently.

2. The system as set forth in claim 1, wherein the first and second image enhancement effects include a histogram transformation.

3. The system as set forth in claim 2, wherein the first image enhancement effect includes a histogram transformation including a blind histogram stretching.

4. The system as set forth in claim 3, wherein the image capture device generates a 10-bit video signal, and the blind histogram stretching is performed using the lowest 8 bits of the 10 bit signal.

5. The system as set forth in claim 3, wherein the second image enhancement effect includes a histogram transformation utilizing substantially the entire dynamic range of the image.

6. The system as set forth in claim 5, wherein the histogram transformation is applied to a modified histogram.

7. The system as set forth in claim 6, wherein the modified histogram is generated using:

$$\text{Histogram}_{mod}=H^X(\text{bin}),$$

where $\text{Histogram}_{mod}$ represents the modified histogram, H represents the horizontal number of pixels of the image capture device, and $0.5 \leq X \leq 0.8$.

8. The system as set forth in claim 7, wherein X=0.7, and wherein the region within the image including the windshield is fully surrounded by the remainder of the image.

9. The system as set forth in claim 1, wherein the first image enhancement effect and the second image enhancement effect are performed at the same time.

10. A computer implemented method of enhancing an image comprising:
   identifying a target vehicle within the image;
   identifying a region within the image including a window of the target vehicle;
   computing a first image enhancement effect for the identified region;
   applying the first image enhancement effect to the identified region;
   computing a second image enhancement effect for a remainder of the image not including the identified region;
   applying the second image enhancement effect to the remainder of the image not including the identified region, the second image enhancement effect different than the first image enhancement effect
   wherein the identified region is completely surrounded by the remainder of the image.

11. The method of claim 10, wherein the first and second image enhancement effects include a histogram transformation.

12. The method of claim 11, wherein the first image enhancement effect includes a histogram transformation including a blind histogram stretching.

13. The method of claim 11, wherein the second image enhancement effect includes a histogram transformation utilizing substantially the entire dynamic range of the image.

14. The method of claim 13, wherein the histogram transformation is applied to a modified histogram generated using:

$$\text{Histogram}_{mod}=H^X(\text{bin}),$$

where $\text{Histogram}_{mod}$ represents the modified histogram, H represents the horizontal number of pixels of the image capture device, and $0.5 \leq X \leq 0.8$.

15. The method of claim 14, wherein X=0.7.

16. The method of claim 10, wherein the first image enhancement effect and the second image enhancement effect are performed at the same time.

17. A non-transitory computer-usable medium for enhancing an image, said computer-usable medium embodying a computer program code, said computer program code comprising computer executable instructions configured for:
   identifying a target vehicle within the image;
   identifying a region within the image including a window of the target vehicle;
   computing a first image enhancement effect for the identified region;
   applying the first image enhancement effect to the identified region to increase the contrast of the identified region;
   computing a second image enhancement effect for a remainder of the image not including the identified region;
   applying the second image enhancement effect to the remainder of the image not including the identified region to increase the contrast of the remainder of the image, the second image enhancement effect different than the first image enhancement effect;
   whereby the contrast of the identified region is increased more than the contrast of the remainder of the image.

18. The non-transitory computer-usable medium of claim 17, wherein the first and second image enhancement effects include a histogram transformation.

19. The non-transitory computer-usable medium of claim 18, wherein the histogram transformation is applied to a modified histogram generated using:

$$\text{Histogram}_{mod}=H^X(\text{bin}),$$

where $\text{Histogram}_{mod}$ represents the modified histogram, H represents the horizontal number of pixels of the image capture device, and $0.5 \leq X \leq 0.8$.

20. The non-transitory computer-usable medium of claim 19, wherein X=0.7.

* * * * *